United States Patent [19]

Dalle

[11] Patent Number: 4,577,436

[45] Date of Patent: Mar. 25, 1986

[54] DEVICE FOR OPENING OUT AND FOLDING BACK ONE OR MORE THERMAL SCREENS INSIDE A HOTHOUSE

[76] Inventor: Yves H. Dalle, Treémollier - Les Granettes, 13100 -Aix-en-Provence, France

[21] Appl. No.: 449,676

[22] Filed: Dec. 14, 1982

[30] Foreign Application Priority Data

Dec. 18, 1981 [FR] France ................ 81 24035
Feb. 22, 1982 [FR] France ................ 82 02990
Jul. 13, 1982 [FR] France ................ 82 12430

[51] Int. Cl.⁴ ............................................. A01G 9/22
[52] U.S. Cl. ............................................. 47/17
[58] Field of Search ............... 47/17, 20, 21, 28; 52/86, 64, 2; 92/34, 44, 120; 135/119, 903, 905, DIG. 8

[56] References Cited

U.S. PATENT DOCUMENTS 3,401,607  9/1968  Wortman ..................... 92/44 X
4,091,584  5/1978  Brown ......................... 47/17 X
4,387,533  6/1983  Grun et al. ..................... 47/17

FOREIGN PATENT DOCUMENTS

3013717 10/1981  Fed. Rep. of Germany .
1270399  7/1961  France ..................... 47/19
2398155  2/1979  France .
2484194 12/1981  France ..................... 47/17
 640703  1/1979  U.S.S.R. ................... 47/19

*Primary Examiner*—Robert A. Hafer
*Assistant Examiner*—Danton DeMille

[57] ABSTRACT

The present invention relates to a device for opening out and folding back one or more thermal screens by a plurality of extensible chambers moving over and around guiding hoops, which chambers comprise a piston forming the movable ends of the chambers, which device comprises, close to and under the piston of each retracted air chamber, a deformable membrane borne by a structure and placed in contact with the periphery of the chamber and whose function is to slow down the extension of the chamber when the latter is pressurized, in order to ensure a good air distribution in the inflated part of said chamber and so prevent that part from winding itself around the guiding hoop when the screen is opened out.

19 Claims, 14 Drawing Figures

DEVICE FOR OPENING OUT AND FOLDING BACK ONE OR MORE THERMAL SCREENS INSIDE A HOTHOUSE

The present invention relates to a device for opening out and folding back one or more thermal screens inside a hothouse.

The technical field covered by the invention is that of means for positioning and removing the thermal screens fitted inside a hothouse and in particular a tunnel-shaped hothouses.

Thermal screens are currently used in hothouse farming to limit heat losses by radiation through the hothouse walls.

Difficulties arise when such screens have to be opened out and folded especially inside tunnel-shaped hothouses.

It is one object of the present invention to propose a device which comprises means for opening out or folding back, over crops planted under glass, one or more thermal screens, depending on the requirement, either to free the hothouse and carry out the farming duties, or to place the crops in a growth-promoting atmosphere.

Another object of the invention is to offer a system which will make the screens easy to open out or to fold back and will prevent them from sticking to their supports due to humidity from condensation inside the hothouse, to static electricity or to the state of the surface of the supports.

Yet another object of the invention is to obtain a maximum retraction of the screens in the folded position so as to prevent any shading along the feet of the hoops of the hothouse, where the screens are folded back.

These objects are reached with a device for opening out and folding back one or more thermal screens inside a hothouse, which device is composed of a plurality of hoops, forming a light structure, distributed at intervals inside the hothouse and designed to guide and support at least one screen, which is fixed on the side of the lower part of the hoops and is connected to traction means provided on the one hand, for spreading the screen over the hoops, and on the other hand, for folding it back at the foot of said hoops.

The device according to the invention further comprises extensible sliding sleeves which surround the said hoops in such a way that the screens are in contact with the said sleeves, this preventing the screens from sticking to their supports during operation.

According to one embodiment, the sleeve is constituted by an elastic cord wound around each hoop, said cord being helically wound and fixed first at the foot of the hoop and also to the longitudinal free edge of the screen.

According to another embodiment, the sleeves are air chambers fixed at the foot of the hoops and comprising, at their free end, a piston perforated in its centre in order to slide over the said hoops, and to which pistons is secured the free longitudinal end of the screen. Said pistons are further provided with fastening means to hold the screen in its spread out position. The device according to the invention also includes means for blowing air into the said air chambers.

The device according to the invention is further provided, close to and under the piston, with a plurality of air chambers in a retracted position, as well as means borne by a structure and placed in contact with the inner or outer periphery of the chamber, the function of which means is to restrain the extension of the chamber when the latter is being pressurized, in order to ensure a good distribution of air in the inflated part of the chamber and to prevent said part from winding around the guiding hoop when the screen is opened out.

The device according to the invention further comprises at least at one of the feet of a number of the guiding hoops, a cylinder which encloses the hoop and at the bottom of which the air chamber is fixed by one of its ends, said cylinder enclosing the chamber when this is fully retracted and comprising, close to its open end, one of the said means for slowing down the extension of the chamber.

As a result of the invention, it is possible to control the positioning, opening out and folding back of thermal screens fitted inside a hothouse and their total or quasi-total folding back at the foot of the guiding hoops so as to prevent any shading which would be bad for the crops, especially morning and evening, when the sun rays are very lowdown.

One advantage of the device according to the invention is its low investment cost, which is due to the nature of the components. The hoops which are for example fixedly mounted on the hothouse structure, are easy to fit. All these hoops form a light structure over which the screens are moved when they are opened out or folded back at the foot of the hoops.

The screens being carried by extensible sleeves sliding over hoops which are metal or plastic tubes, are easy to open out or to fold back.

In the embodiment comprising air sleeves, a plurality of screens and even a plurality of hothouses can easily be operated from a single source of air circulated by way of one or more low pressure blowers or any other equivalent means.

Independently of these advantages inherent in pneumatic systems, the air device allows the air to circulate inside the volume defined by the screen, this being quite an advantage with certain crops. This air circulation forms an air cushion supporting the screen by blowing.

By extensible sleeves are meant any means which encircle the hoops, such as low power helical springs in metal or plastics, slide-blocks, air chambers and any other similar means preventing the screens from being in contact with their supports, thus eliminating the screen-braking effects during operation which tend to stick the screens to their supports, due to condensation inside the hothouse, static electricity or to the state of the surface of the hoops.

The braking means surrounding the air sleeve or provided outside or inside said sleeve and which exert a pressure on its inner or outer periphery, ensure a good distribution of the air in the part of the sleeve situated downstream of said means, and as a consequence, the sleeve extends taking the screen with it but without curling around its guiding hoop as this occurs with other devices not provided with such means.

With the embodiment in which the sleeve is fully contained inside a cylinder when in the retracted position, it is possible to fold the screens back to ground level, by sinking the cylinders into the ground up to their opening, in order to obtain a complete retraction of the screen or, depending on the case, sinking them only partly into the ground to fold the screens close enough thereto.

The invention will be more readily understood on reading the following description, with reference to the accompanying drawings in which:

FIG. 3 is a cross-sectional view of the hothouse according to FIG. 2, in which the screens can be fastened in any point of the hothouse, the pistons in opposition cooperating together;

FIG. 14 is a cross-sectional view of a cylinder similar to that shown in FIGS. 12 and 13, inside which is partly retracted an air chamber. The means used for slowing down the extension of the air chamber and to ensure a good air distribution inside it, are constituted by a sleeve-shaped pocket, fixed by its lower end to the bottom of the cylinder and provided at its other end with a disc which comprises perforations to create air leaks, which disc is situated close to the piston when the chamber is in the fully retracted position. The air admitted through orifices provided in the central tube is first introduced into the sleeve-shaped pocket and then into the air chamber in order to cause, both the deformation of the sleeve-shaped air pocket, and the extension of the air chamber. Said chamber is retracted by depression, the air passing through the said orifices. The fitting of thermal screens in hothouses and in particular in tunnel-shaped hothouses, implies the installation of one or more screens, particularly in large-size hothouses, such as those reaching 30 to 60 meters in length.

Figure 1:
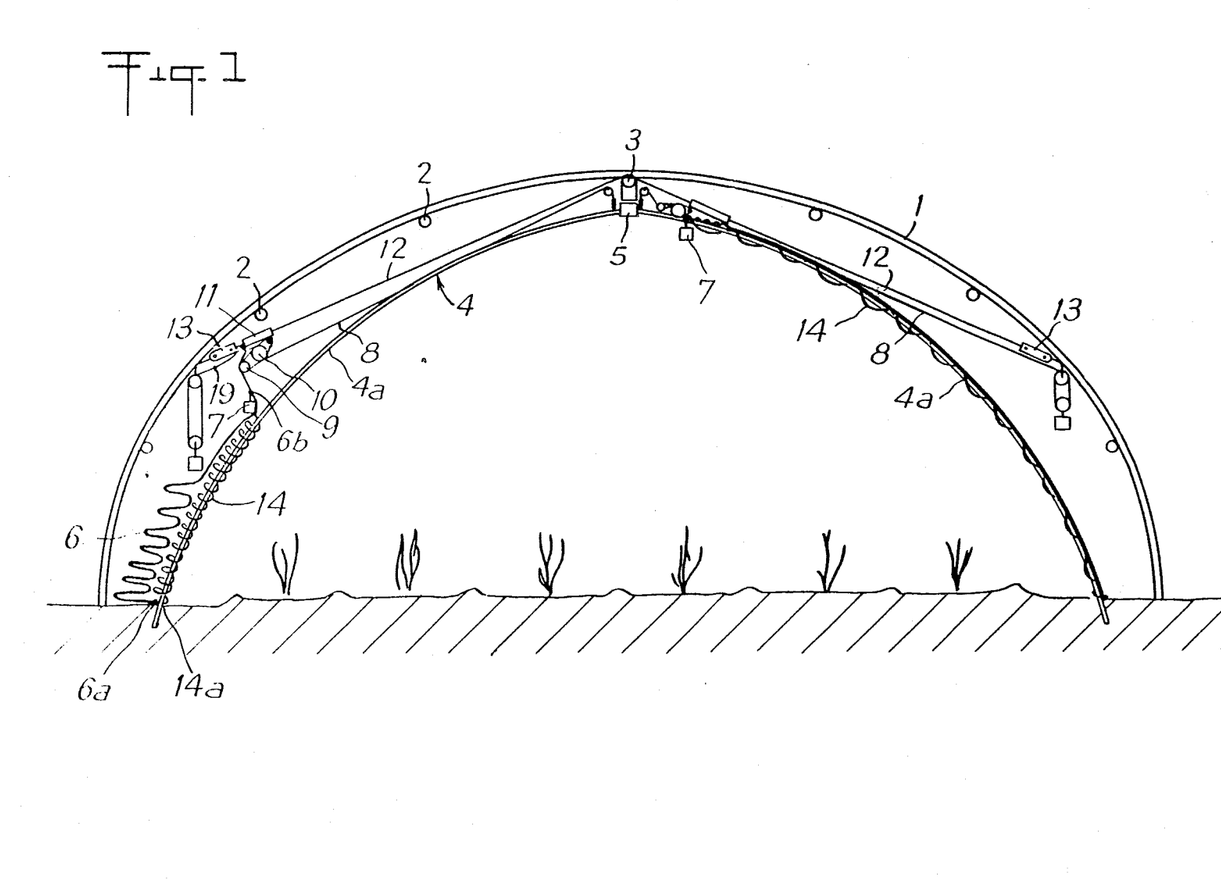
FIG. 1 is a cross-sectional view of a tunnel-shaped hothouse in which the screens are opened out and folded back by way of mechanical means, the sliding of the screens over their support being improved by the presence of a spring wound around the bent rods carrying the screens supports.

Referring first to FIG. 1, this diagrammatically shows a cross-section of a hothouse, composed of a structure of arches 1, distributed at intervals over the length of the hothouse and interconnected by longitudinal side members 2 and a longitudinal member 3 fixed in the center of the hothouse roof. The hothouse covering can be for example a translucid plastic which is fixed over the structure.

According to one embodiment, the device comprises a plurality of hoops 4, distributed at intervals inside the hothouse and extending transversely. Each hoop is preferably composed of two bent rods 4a fixed on a fitting plate 5, which is itself fixed to the longitudinal member 3. Said hoops 4 are designed to support the screens 6. These screens are produced for example from a film of metallized polyester infrared-treated on one or two faces, and are designed to be stretched over crops by being supported by the hoops 4, such as illustrated on the righthand side of FIG. 1, or to be folded back to the feet of said hoops and between said feet and the feet of the arches 1 of the hothouse, such as illustrated on the lefthand side of the figure. Said screens 6 are shaped as rectangular sheets, the lower longitudinal edge 6a of which is fixed at the foot of the hothouse. Their upper longitudinal edge 6b is provided at each end with a weight 7 which will help the screens to fold back.

The screens 6 are opened out over the crops by means of cables 8, fastened to the ends of their upper edge 6b, which cables are wound over one or more winding drums so as to simultaneously open out all the screens 6 contained inside the hothouse.

Each screen 6 is pulled out by means of two sets of grooved pulleys 9/10, around which are wound the cables 8 fastened in extension of the lateral edges of the screen, and each set of pulleys is carried by a sliding block 11 sliding over a guideline 12 stretched between tension idlers 13. In order to prevent the screen from sticking to the bent rods 4a, these are provided with an extensible sleeve 14 which, according to one embodiment of the invention, is constituted by a cord helically wound around the said rods 4a in spring-like manner. Said cord is fixed on the one hand, to the foot 14a of the supports and on the other hand, to the edge 6b of the screen. The cord constituting said sleeve is of small cross-section, about 1 mm$^2$, and the winding diameter is relatively large with respect to the cross-section of the supporting rods, for example in a 1 to 100 ratio, so that when the screen is spread over the crops, the spring can extend over the whole length of the hoops 4a, and when the screen 6 is folded back, the spring 14, winding into adjoining spires, occupies a minimum of space at the foot of the supports 4.

In this particular embodiment, the cord interposed between the guiding rod 4a and the screen 6 prevents the latter from sticking to its support under the effect of humidity due to condensation inside the hothouse, of static electricity or of the state of the surface of the support.

Figure 2:
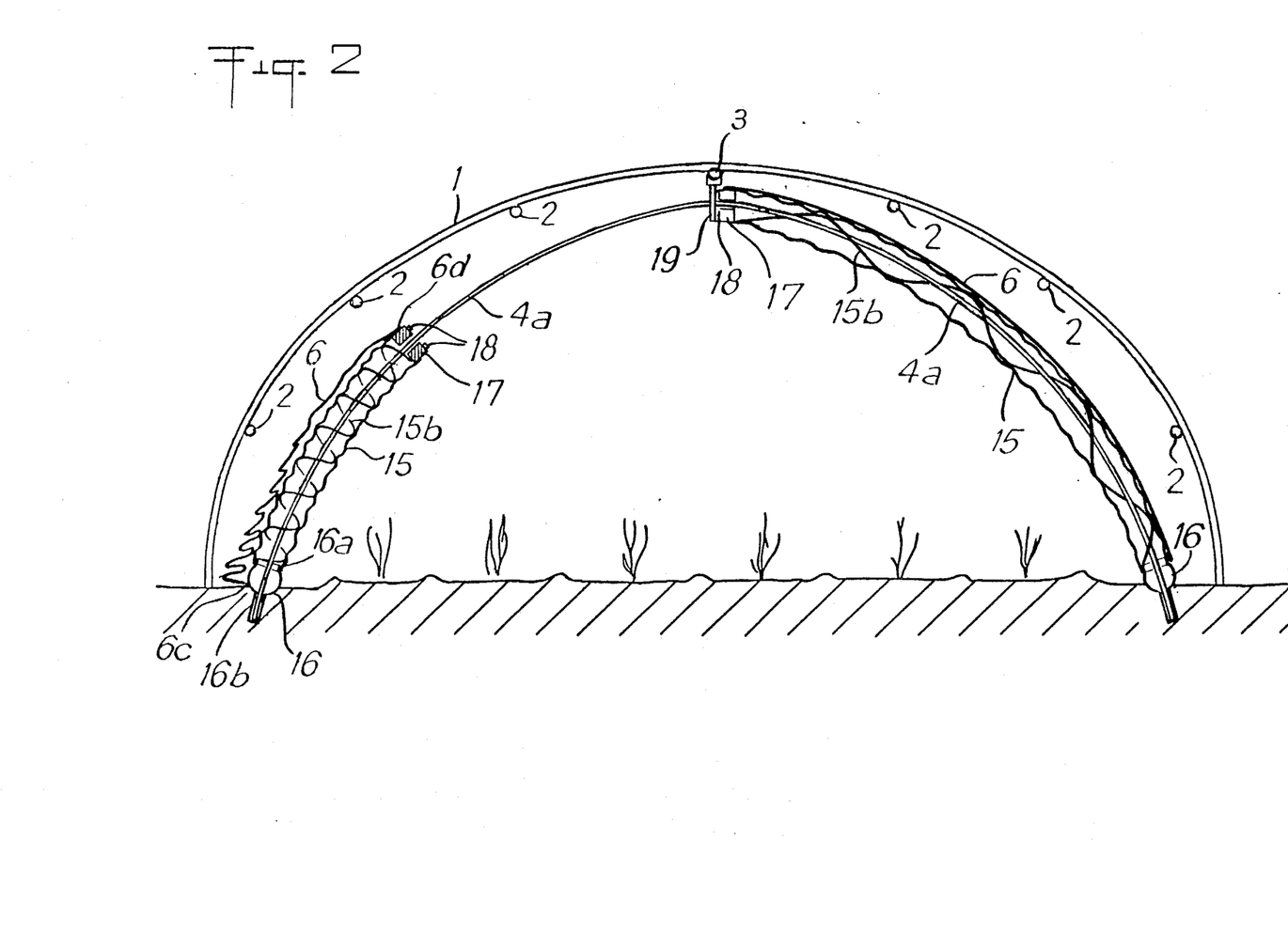
FIG. 2 is a cross-sectional view of a tunnel-shaped hothouse wherein the screens are opened out and folded back by pneumatic means fastening up at the rooftop of the hothouse; the air is supplied by two air collectors situated at the bottom of the supporting hoops.

According to another embodiment, illustrated in FIG. 2, the extensible sleeve, permitting to overcome the aforementioned effects, is an air chamber fixed on an air collector 16, provided at the foot of the guiding rods 4a. Said air collector 16 comprises neck portions 16a over and around which are fitted the sleeves 15 by their lower end, fastening being achieved by means of clamps.

For example and as illustrated in the figures, the rods 4a go right through the air collectors 16 and are engaged inside the housing 16b extending at the lower portion of the air collectors and sunk into the ground.

The sleeves 15 are provided at their free end with a piston 17, which is perforated in its center in order to slide along the guiding rod 4a. Said sleeve 15 is fitted over and around a piston 17, of which the outer periphery can have any shape but is preferably circular. The screen 6 is fixed, on the one hand, at the feet of the hoops of the hothouse, for example to the collector 16, in 6c, and on the other hand, to the pistons 17 in 6d. Two or more air chambers may be necessary for the good operation of the screens.

Means such as, for example, permanent magnets 18, are provided to keep the screens 6 in the opened out position, said magnets cooperating with metallic parts having magnetic properties, for example in soft steel. Said parts are either plates which are fixed to some of the pistons: the pistons opposite those equipped with the permanent magnets, or they are plates which are fixed in the center of the hothouse roof.

FIG. 2 illustrates an embodiment of such a device whose magnets 18 are fixed to the piston 17 in order to cooperate with the plate 19 situated in the medium plane longitudinal to the center of the roof and inside the hothouse. Obviously, as a variant, the piston could just as well be fitted with a metallic plate to cooperate with permanent magnets fixed on the support 19.

For the device to work reliably, at least two magnets are necessary, in which case they are diametrically opposite and preferably symmetrically placed.

The air admitted from a source of pulsed air such as for example a low pressure blower (not shown) inside the air collector 16, is introduced into the chambers 15. The rise in pressure tends to cause the displacement of the piston 17 along the guiding rods 4a, taking the screen 6 with it. At the end of the upward stroke, the piston coming level with the plate 19 is applied thereon under the effects of the magnets 18. In this position, the screen is opened out as shown in FIG. 2.

FIG. 3 shows a tunnel-shaped hothouse 1, in which the screens 6 are opened out to cover all the crops. According to this embodiment, the piston 17 fitted on the air chamber, situated on the lefthand side of the figure, is equipped with permanent magnets 18, the piston 17$_1$, which composes the sleeve 15$_1$, situated on the righthand side of the figure, is equipped with a soft steel plate 19. In this particular example, the screen 6$_1$ is spread out to the full, the effect of this being to cover the crops beyond the longitudinal axis of the hothouse. The screen 6 is as a result only partly opened.

According to this embodiment, it is possible, in certain conditions, to shade the crops over entirely, or only partly to create shaded areas, by fitting the hothouses with screens which are metallized and infrared-treated on both faces.

Figure 4:
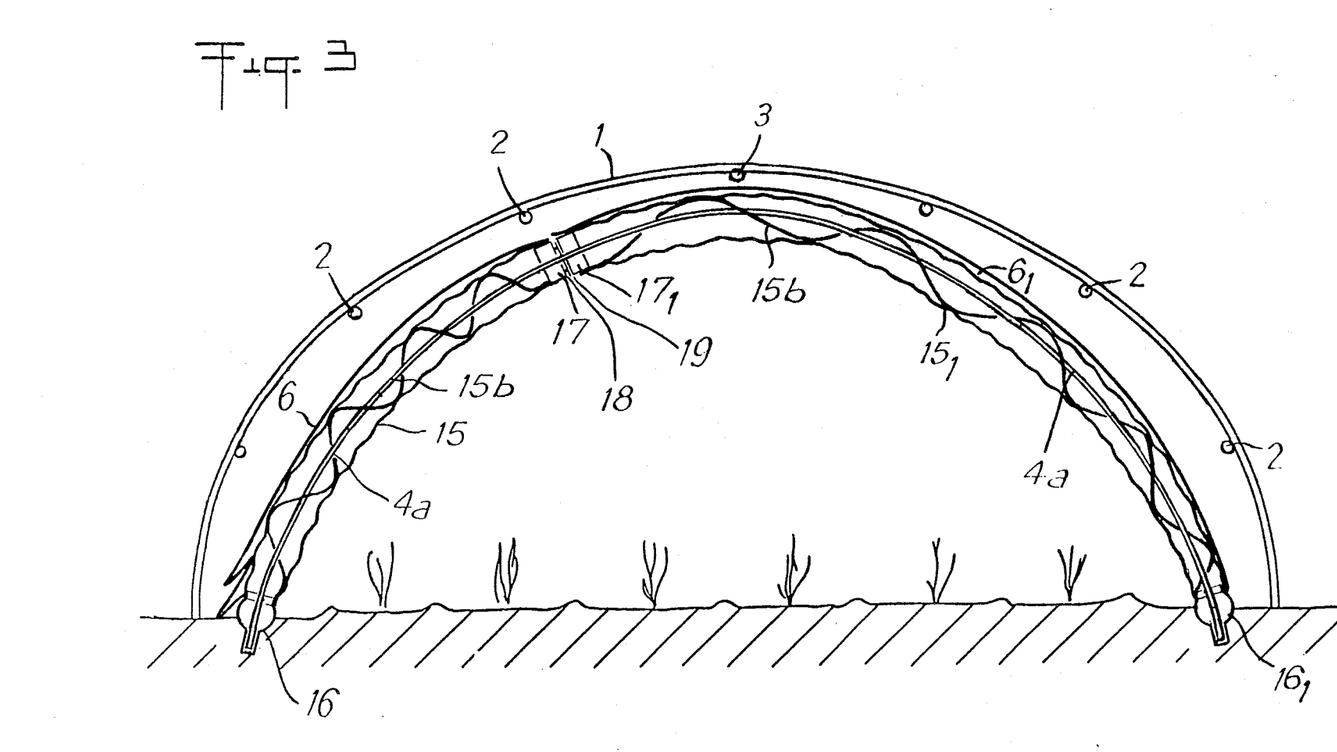
FIG. 4 is a cross-sectional view of a tunnel-shaped hothouse in which the screens are opened out and folded back by pneumatic means, the screen supports being tubes to allow a distribution of air on the supports feet side, the air being supplied by an air collector situated under the roof of the hothouse, and the screens fastening onto said air collector.

FIG. 4 illustrates another embodiment of the device according to the invention, in which the air chambers 15 are fitted by their lower end, over and around anchoring pieces 20 provided, at their lower end, with a recess 20a into which is engaged the guiding rod 4a. Said latter is a tube of small cross-section of which the end, situated on the side of the piece 20, comprises perforations 4b on its periphery.

The sleeves in FIG. 4, like the sleeves in FIGS. 2 and 3, are fixed around pistons perforated in their center so as to move along the guiding rods 4a. Air is supplied from a central air collector 21, situated inside the hothouse and under the center of the roof thereof, into which air collectors issue the guiding-tubes 4a. Plates in soft steel 22, applied against the collector are designed to receive the piston 17 when the screens 6 are opened out, said plates 22 being equipped, as in the preceding example, with permanent magnets 18.

The air pulsed by a low pressure blower, or any like device, is distributed through the air circuit composed of the collector 21, and the guiding rods 4a, to be introduced into the sleeves 15, via orifices 4b. Under the effect of the air pressure rising inside the sleeves 15, the pistons 17 are caused to move, taking with them the screens 6 until the magnetized pistons meet with the plates 22.

According to a variant, illustrated on the right of the FIG. 4, the air sleeves 15 are provided, on the side of the pistons 17, with orifices 15a of small cross-section, to create air leaks and to arrive at two results: to obtain a circulation of fresh air inside the volume defined by the screen, this especially when breeding certain plants, and to have the screen supported by a cushion of air and thus keep a distance between the screens and the guide-rods 4a which are not protected by the sleeves 15. This particular design enables to reduce the number of hoops fitted with air sleeves 15. Said air sleeves are of circular or oval cross-section.

According to another embodiment, said air sleeves are made from a film of plastic material, such as polyester or the like. They have the advantage of being relatively inexpensive but when the screens are folded back, said sleeves tend to fold back irregularly.

To overcome this problem, the device according to the invention is equipped with sleeves which are provided with a reinforcement constituted by a helical spring 15b, placed inside or within the thickness of their wall, to help the retraction of the sleeves and to keep them in an orderly position with respect to the guiding rod.

As a variant, the device according to the invention can be equipped with bellows-type sleeves which have the advantage of folding back well.

The screens are preferably folded back by creating a depression inside the air chamber under the effect of the low pressure blower or any other similar means. In this case, the depression should be greater than the pulling force of the permanent magnets in order to detach the magnets and to retract the screens with a view to folding them back at the foot of the hoops. For a better operation of the device, the pistons 17 can be weighted. Only the air chambers 15 which comprise a reinforcement or are constituted by a bellows-type sleeve, are capable of radially withstanding the effects of an air depression created inside their inner volume. Simple air chambers which comprise no reinforcement, are detached manually for screen-retraction purposes. This operation is made easy if the device is provided with tags fixed to the pistons 17 and accessible from the ground.

Figure 5:
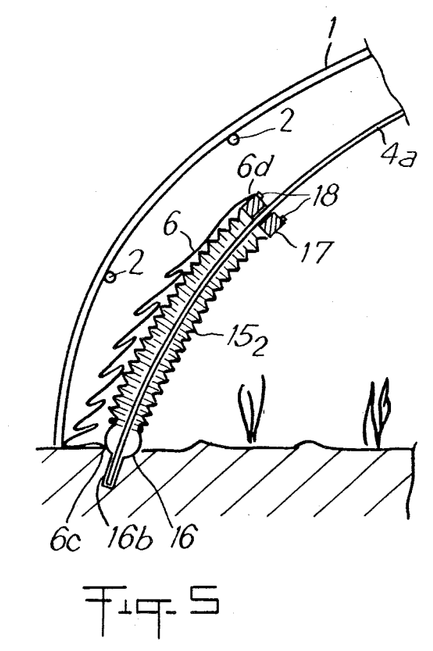
FIG. 5 is a partial cross-section of a tunnel-shaped hothouse in which the screens are opened out and folded back by pneumatic means, the air chambers being bellows-type sleeves.

FIG. 5 illustrates a device of which the air chamber is a bellows-type sleeve $15_2$. Said sleeve is mounted in the same way as sleeve 15, illustrated in FIG. 2. It comprises an adequate number of bellows to be able to extend over the guide-rods 4a. When the screen is folded, the adjoining bellows are returned fairly lowdown at the foot of the arch 4. According to one embodiment, said sleeves are produced from a synthetic material such as for example elastomer. Whether or not they are reinforced, said sleeves are capable of withstanding radially any depression which will cause the release of the magnets 18 when the screen 6 is folded back.

Figure 6:
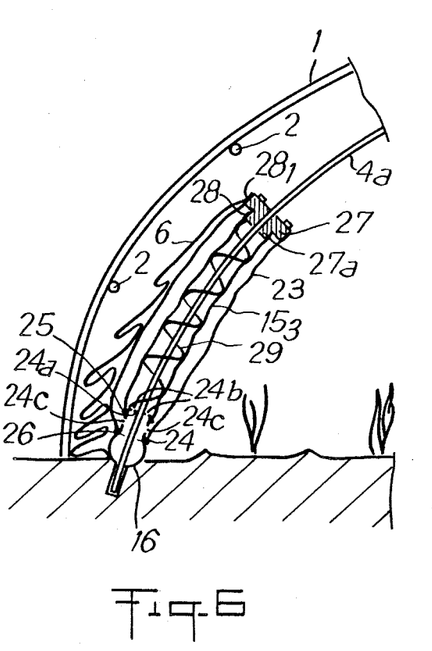
FIG. 6 is a partial cross-section of a tunnel-shaped hothouse, in which the screens are opened out and folded back by a pneumatic device and which comprises two air chambers, one of which of smaller cross-section comprises a reinforcement and is engaged inside the other of larger cross-section; when the screen is opened out, the air pressure acts over the entire surface of the piston, the air being blown into the two chambers; when the screens are folded back, the depression only acts inside the inner air chamber.
Figure 7:
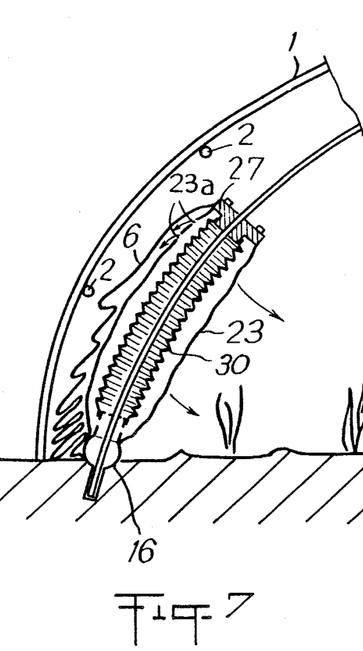
FIG. 7 is a partial cross-section of a tunnel-shaped hothouse, in which the screens are opened out and folded back by way of a device similar to that used in FIG. 6; in this particular example, the inner air chamber is a bellows-type sleeve.

FIGS. 6 and 7 illustrate two variants of another embodiment of the invention. According to FIG. 6, the device comprises around some of the guiding rods 4a, two air chambers, one of which, of smaller cross-section $15_3$, is surrounded by another chamber 23 of larger cross-section.

The chamber $15_3$ is fitted at the bottom of the guiding rods 4a into a tapping forming a neck 24 which extends on the periphery of the air collectors 16. Said neck 24 comprises at its free end a wall 24a which is perforated in its center to receive said guiding rod 4a, holes 24b being provided around said central perforation or bore. The chamber $15_3$ is secured on the end of the neck 24 by means of a clamp 25. Beneath the said clamp the neck 24 comprises holes 24c provided in its wall between the clamp and the part where the neck begins. The chamber 23, of larger cross-section, is fastened under the holes 24c by means of another clamp 26.

The piston 27, to which are fastened the chambers $15_3$ and 23, comprises in its central part, which is perforated to allow the passage of the guiding rod 4a, a boss 27a around which is fitted the free end of the chamber $15_3$ which is secured thereon by means of a clamp 28.

The chamber 23 is secured around the piston 27 by way of a clamp $28_1$.

The chambers $15_3$ and 23 can have any shape of cross-section: circular, oval, etc.

Preferably however, they are cylindrical.

The central air chamber $15_3$ is preferably provided with a reinforcement constituted by a helical spring 29, or any other equivalent means such as for example rings, etc.

As in the preceding examples, the screen 6 is fixed, on the one hand, at the foot of the hothouse and on the other hand, to the pistons 27.

To open out the screen 6, the air passing through the collector 16 is blown into the two chambers $15_3/23$. The pressure of this air acts over the entire surface of the piston. The screen is borne by the chamber 23, which chamber is produced from a light film of polyester for example.

The chamber $15_3$, as the chambers 15 described hereinabove, has a reinforcement 29. Said chamber is more particularly adapted to folding back the screen 6. To do this, a depression is created inside said chamber $15_3$ in order to return the said screen to the foot of the hothouse.

The device illustrated in FIG. 7 is similar to that of FIG. 6 for its main elements.

According to this embodiment, the central chamber 30 is a bellows-type sleeve fixed to the piston 27 and to the collector 16 as indicated with reference to FIG. 6. The sleeve 30 is for example very similar to that shown in FIG. 5.

As a variant, the chamber 23 is perforated on the side of piston 27, to create air leaks 23a with a view to circulating fresh air under the screen 6 and to support the latter by blowing.

Figure 8:
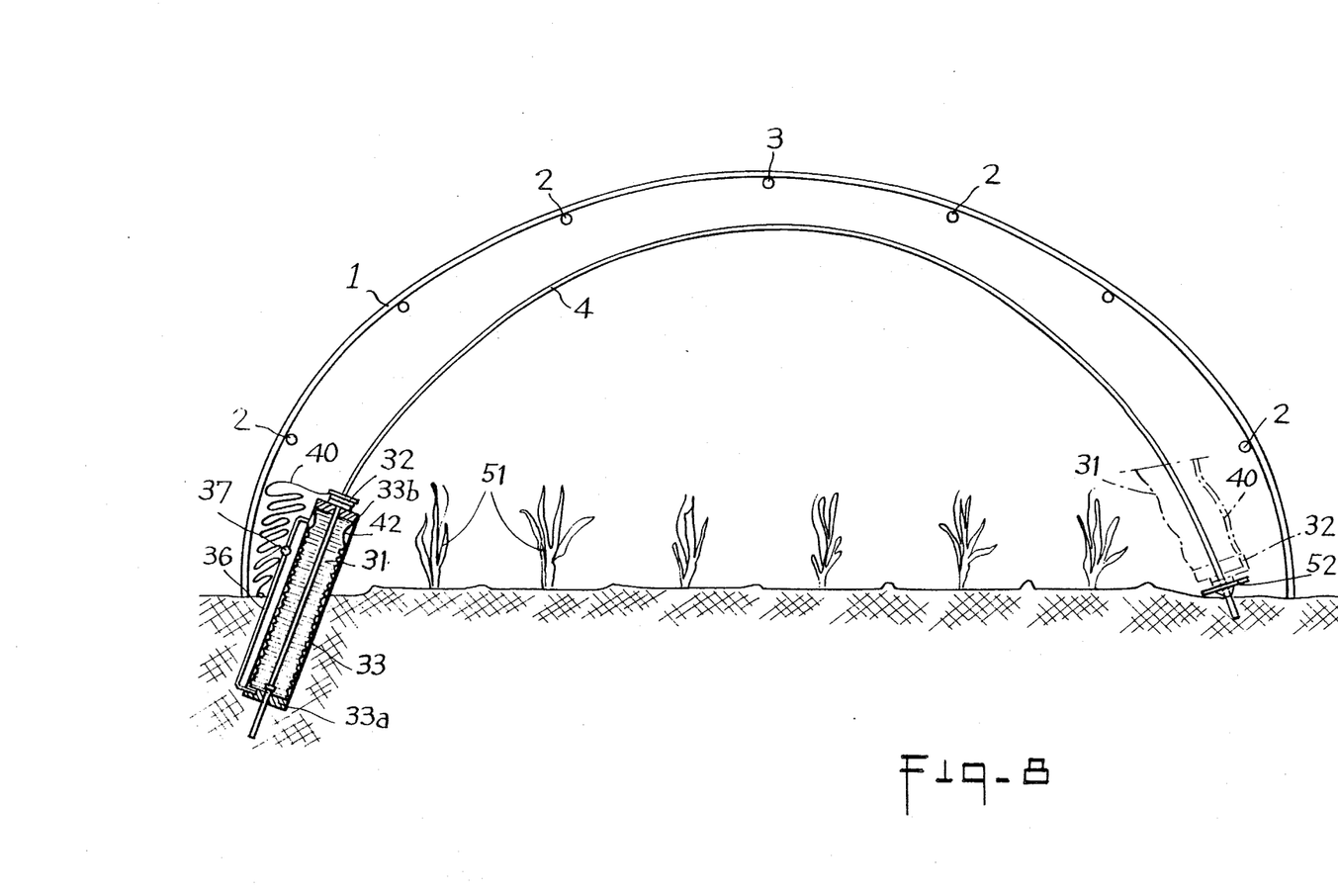
FIG. 8 is a cross-sectional view of a hothouse illustrating a device according to the invention comprising a cylinder inside which is fitted an air sleeve.

FIG. 8 diagrammatically shows a cross-section of a tunnel-shaped hothouse. Said hothouse is composed of a structure of arches 1, distributed at intervals throughout its length and joined together by means of longitudinal side members 2 and one longitudinal member 3 fixed to the center of the hothouse roof. The covering of the hothouse is for example a translucid plastic material fixed on said structure.

As already explained hereinabove, the device comprises a plurality of guiding hoops 4, distributed inside the hothouse and extending transversely. According to one embodiment, the hoops 4 are made in one piece and their ends are sunk into the ground on the side of the lower lateral edges of said structure, in such a way as to leave between them and the arches 1 a space designed to receive the screens in their folded position.

The hoops 4 guide air sleeves 31 which are fixed, on the one hand, at the foot of the hoops, and on the other hand, to a piston 32, perforated in its center in order to slide along the said hoops.

According to one embodiment, the chamber 31 is secured to the lower part of a cylinder 33 closed at its lower part by a base 33a and open at its upper part to receive, in the retracted position of the chamber 31, the piston 32 which is also cylinder-shaped.

Figure 9:
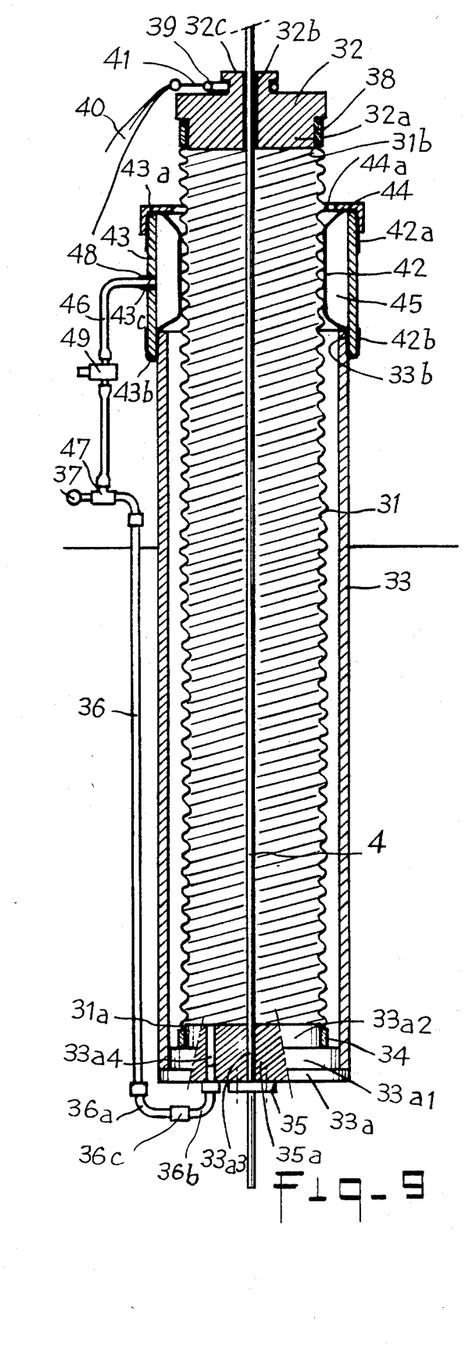
FIG. 9 is a cross-sectional view on a larger scale of a cylinder inside which is retracted an air chamber. In this figure, the piston is shown in the delivery position. The means for slowing down the extension of the chamber and to ensure an even distribution of the air blown therein are composed of a deformable membrane forming, in combination with the upper part of the cylinder an annular air pocket which surrounds the chamber.

For clarification purposes, an assembly comprising a cylinder 33 and an air chamber 31 is illustrated on an enlarged scale in FIG. 9.

According to this embodiment, the cylinder 33 is made from plastic material, such as P.V.C., and is composed of a cylindrical tube closed at its lower part by a base 33a. Said latter comprises a hammered out portion of cylindrical shape $33a_1$ forming a shoulder on which the tube rests. Said base comprises a second hammered out portion of cylindrical shape $33a_2$ over and around which the lower end 31a of the air chamber 31 is engaged. Said chamber is fastened on said portion by a clamp 34.

Figure 10:
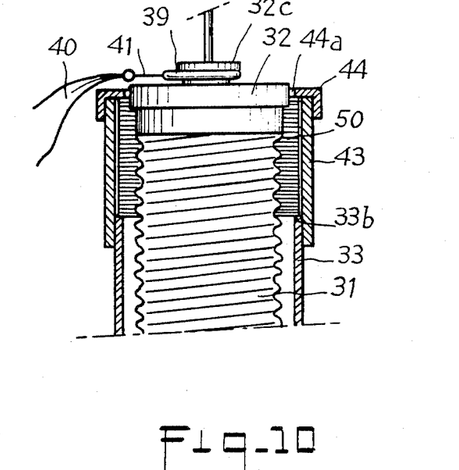
FIG. 10 is a partial cross-section of a cylinder similar to that shown in FIG. 2. In said figure, the piston closes off the upper part of the cylinder. The means used to slow down the extension of the sleeve and to ensure a good air distribution inside it are constituted by a cylindrical tubular element in synthetic foam or composed of flexible fibers planted in brush-like manner.

The base 33a is perforated through in its center to receive one of the ends of a guiding hoop 4. Said hoop extends outside the cylinder and comprises a flat flange 35 which is fixed by welding, and extends inside a plane perpendicular to the hoop, on which flange rests the cylinder. The flange 35 comprises a plurality of holes 35a, four for example, placed at 90° one from the other, and through which are threaded the fastening screws (not shown) which are screwed into tapped holes provided through the thickness of the base 33a. Said latter is also provided with a through conduit 33a₄ which issues into the air chamber 31. Said conduit is connected to a pipe 36 through which air is fed into the chamber 31. Said pipe is itself connected to an air collector 37 extending horizontally on the side of the cylinder 33. Said pipe 36 extends laterally and externally to the cylinder 33 and is parallel thereto; it comprises at its lower part, a bend 36a and an elbow union 36b, secured to the conduit 33a₄, which bend 36a and elbow unions 36b are joined together by means of a connecting sleeve 36c. The air chamber 31 can have any of the different shapes described hereinabove. As illustrated in FIGS. 9 and 10, they can be bellows-type sleeves made from a film of plastic material, preferably polyester or the like, and comprise a reinforcement such as a helical spring placed inside the sleeve. This particular embodiment is preferably adopted to obtain the correct extension and retraction of the air chamber. At its other end 31b, the chamber is secured to the piston 32. Said piston, made for example of P.V.C. has in one particular embodiment the shape of a cylinder and comprises a hammered out portion 32a of cylindrical shape, around which is engaged the end 31b of the sleeve 31. Said sleeve is secured in position thereon by way of a clamp 38. The piston 32 is perforated through its center to form a conduit 32b of slightly greater dimensions than the hoop 4 so as to be able to slide freely over the latter. The conduit 32b can have a circular cross-section to cooperate with hoops produced from cylindrical rods or tubes. In order to prevent the piston 32 from rotating about the hoop 4 during the extension or retraction of the sleeve 31, said hoop 4 is made for example from a tube or rod of oval or any other cross-section, for example square, rectangular, cross-shaped, etc. Obviously, the conduit 32a is produced so as to have a corresponding cross-section to that selected from the hoop.

Figure 11:
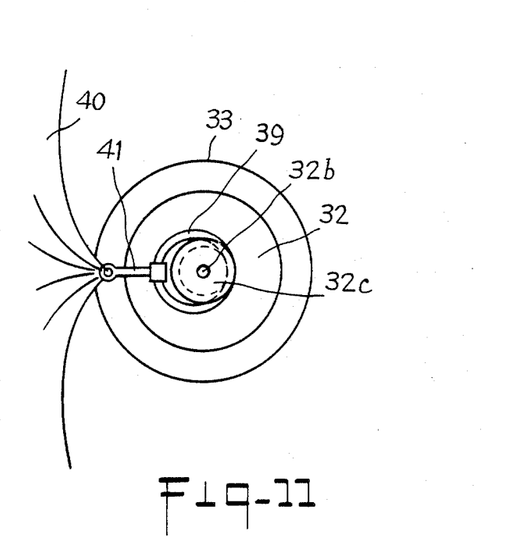
FIG. 11 is a plan view of any one of the cylinders shown in FIGS. 9 and 10.

The piston 32 further comprises on the opposite side of the hammered out portion 32a, a flange 32c, in the groove of which is engaged a ring 39 to which is secured the screen 40 via a supple strap 41. Said ring 39 (FIG. 11) has a larger diameter than the flange 32c to allow easy fastening and detaching of the screen 40.

According to the embodiment illustrated in FIG. 9, the means used for slowing down the extension of the sleeve 31 consist in a deformable membrane 42 which is pressurized by the air blown in for extending the air chamber 31. Said membrane 42 is made for example from a strip of plastic film such as a film of polyester, the outer edges of which are sealed together to give to the membrane a tubular shape. The longitudinal edges 42a and 42b of this tubular element are turned over the peripheral edges 43a/43b at the top and at the bottom of a cylindrical sleeve 43 of inner diameter slightly larger than the outer diameter of the cylinder 33. The assembly consisting of the sleeve 43 and of the membrane 42 is forced fitted over the upper end 33b of the cylinder. The membrane 42, inserted between the cylinder 33 and the sleeve 43, is tightly secured where the parts 33b/43b of these two elements are joined together.

The upper part 43a of the sleeve with the turned over edge 42a of the membrane is partly closed by a cylindrical lid 44 of internal diameter slightly greater than the external diameter of the sleeve 43, which lid is fitted over the upper part of the sleeve 43 by inserting the membrane 42 which is also tightly secured on that part.

The lid 44 comprises in its central part a concentric circular recess 44a of diameter slightly larger than the external diameter of the piston 32, so that, as illustrated in FIG. 10, the piston 32, when the membrane 31 is in the retracted position, closes off the upper part of the cylinder 33.

The membrane 42, when fitted in this way on the cylinder 33, forms an annular air pocket 45. The deformation of the membrane is obtained by introducing into said pocket air which is pressurized by a low pressure blower or any equivalent means, also used to extend and to retract the sleeves 31. The air brought in by the collector 37 is admitted into the pocket 45 via a pipe 46 for example a flexible plastic pipe fitted on a T-shaped endpiece, welded on the pipe 36 which feeds air to the air sleeve 31, and around another endpiece 48 of a connection engaged inside an orifice 43c provided in the wall of the sleeve 43 and issuing into said pocket. A valve 49, such as a slide valve for example, controls the air flow into the pocket 34 to modulate the deformation of the membrane 42 and in doing so, slowing down, more or less, the extension of the air chamber 31.

When folding back the screens 40 and therefore when the chamber 31 is retracted, this retraction being caused by the depression created in the air circuit, the membrane 42, which was in contact with the chamber 31, retracts and enables the latter to retract freely inside the cylinder 33, until the piston 32 closes off the cylinder at the level of the lid 44.

As a variant, the means provided for slowing down the retraction of the air chamber 31 consist in a cylindrical tubular element 50 of external diameter substantially equal to the inner diameter of the sleeve 43, and of inner diameter smaller than the external diameter of the chamber 31, so as to rest on the periphery of the latter. Said element 50 is housed between the upper edge 33b of the cylinder 33 and the lid 44.

According to one embodiment, the said element 50 is made from synthetic foam, such as polyurethane foam for example.

According to another embodiment, the element 50 is made up of a plurality of supple fibers implanted into a support and extending radially so that their free ends define a cylindrical recess of diameter slightly smaller than the external diameter of the chamber 31 so as to be in close contact therewith and to slow down its extension.

As illustrated in FIG. 8, when the screens 40 are folded back at the foot of the hoops 4 and of the arches 1, the plants 51 are completely exposed to the sun rays, the screens being nearly completely folded due to the fact that the cylinders 33 are partly sunk into the ground soil. The screens are, as illustrated in said figure, opened out or folded back by means of air chambers extending over the length of the hoops 4 and being retractable inside the cylinders 33 situated at one of the feet of the hoops. As already indicated hereinabove, the piston 32 can be equipped with permanent magnets cooperating at end-of-stroke with soft steel plates 52 to hold the screen 40 in a spread out position.

The embodiment illustrated in FIG. 8, is in no way restrictive; indeed, as described hereinabove, the screens can be spread out so as to be joined together in the center of the hothouse roof, or anywhere along the hoops 4. According to this variant, a cylinder 33 is placed at each foot of those hoops equipped with the means for spreading out and folding back the screens.

Figure 12:
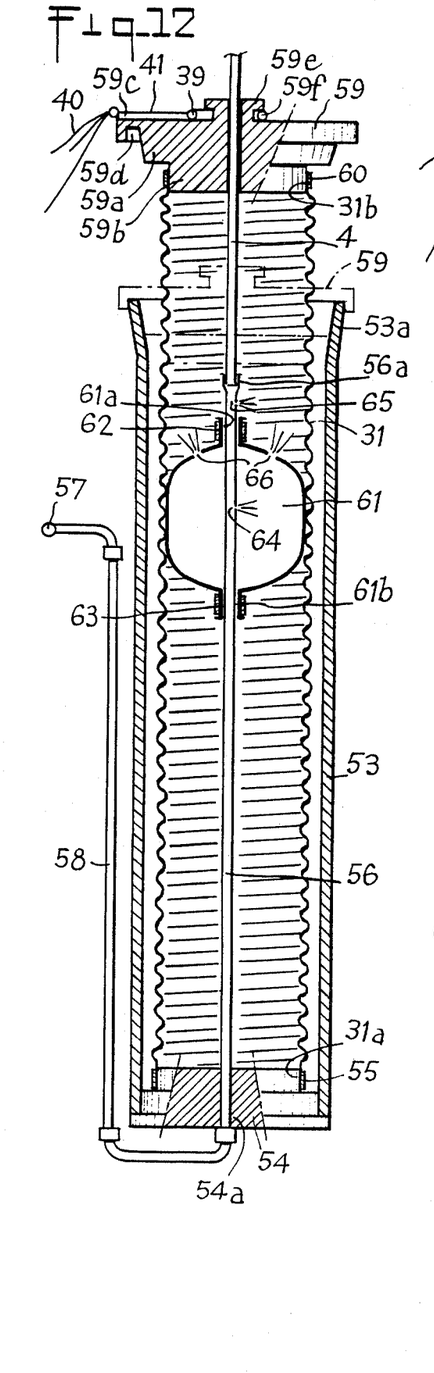
FIG. 12 is a cross-sectional view of a cylinder, inside which is partly retracted an air sleeve. The piston is arranged so as to act as a lid and to close off the opening of the cylinder. The means used for slowing down the extension of the air sleeve and to ensure a good air distribution inside it are composed by a pocket-shaped deformable membrane placed inside the chamber and supplied with air through a pipe substantially co-axial to the air chamber. Under the air pressure, the pocket deforms and rests against the inner periphery of the sleeve, thus slowing down its extension.

Referring now to FIG. 12, this shows another embodiment of the device according to the invention comprising means for obtaining a correct extension of the air chamber 31.

As described in the preceding examples, the chamber 31 is placed inside a cylinder 53 and is secured on the base 54 thereof, which base is mounted as indicated with reference to FIG. 9. The chamber 31 is fixed on said base by one of its ends 31a by means of a clamp 55. Said base 54 is perforated in its center to form a cylindrical conduit 54a, in which is engaged a pipe 56, connected to an air circuit comprising a collector 57 and a pipe 58.

The pipe 56 extends substantially co-axially to the cylinder 53, whose open end 53a widens out to form a truncated opening. The end of the pipe 56 ends substantially where the widening-out part 53a starts and comprises a female endpiece 56a designed to receive a guiding hoop 4.

The chamber 31 comprises at its other end 31b, a piston 59. Said piston comprises a conical portion 50a, designed to cooperate with the widening-out part 53a of the cylinder. Its lower part is extended by a cylindrical hammered out portion 59b around which is fastened the chamber 31 by way of a clamp 60. Its upper part is lid-shaped and defines a groove 59d in which is engaged the rim of the conical opening 53a when the piston is brought back against the cylinder, such as illustrated in dashed and dotted lines in the drawing, and when the sleeve is housed inside said cylinder.

The piston 59 also comprises at its upper part, a flange 59e in the groove of which is engaged a ring 39 to which is secured the screen 40 via a supple strap 41 similar to that described with reference to FIG. 9.

Said piston 59 is provided in its center with a cylindrical through-conduit 59f, of diameter slightly larger than that of the hoop 4, so as to be able to slide freely on said hoop.

The means used for slowing down the extension of the air chamber 31 consist in a pocket 61, made from a deformable membrane of plastic material, such as polyester, of external diameter substantially equal to the inner diameter of the air chamber 31 when retracted.

Said pocket comprises two necks 61a/61b situated at opposite ends, and through which passes the air pipe 56. The pocket 61 is tightly secured to the pipe 56 by two seal collars 62/63. The air admitted into the pocket 61 to cause its deformation is injected through one or more orifices 64 provided in the wall of the pipe 56 and situated between the two necks 61a/61b.

To control the inflating of the pocket 61 and obtain the exact pressure required to cause the correct extension of the air chamber, the pocket 61 is provided with air leaks 66, constituted by orifices of small diameters, for example four such orifices having a diameter of 5 mm.

The air which is pressurized by a low pressure blower or similar means is brought through the collector 57 and pipes 58/56 and is introduced into the pocket 61, via the orifice 64 and into the chamber 31 via the orifice 65. The pressurization of the air contained inside the pocket 61 causes the latter to expand until its wall is resting on the inner periphery of the chamber 31 and slows down the extension of said chamber; when folding back the screens 40 and thus slowing down the retraction of said chamber 31 caused by the depression created in the air circuit, the pocket 61, which was in contact with the inner face of the chamber 31, retracts inside said chamber and enables the latter to retract freely inside the cylinder 53 until the piston 59 closes off the upper part of the said cylinder.

Figure 13:
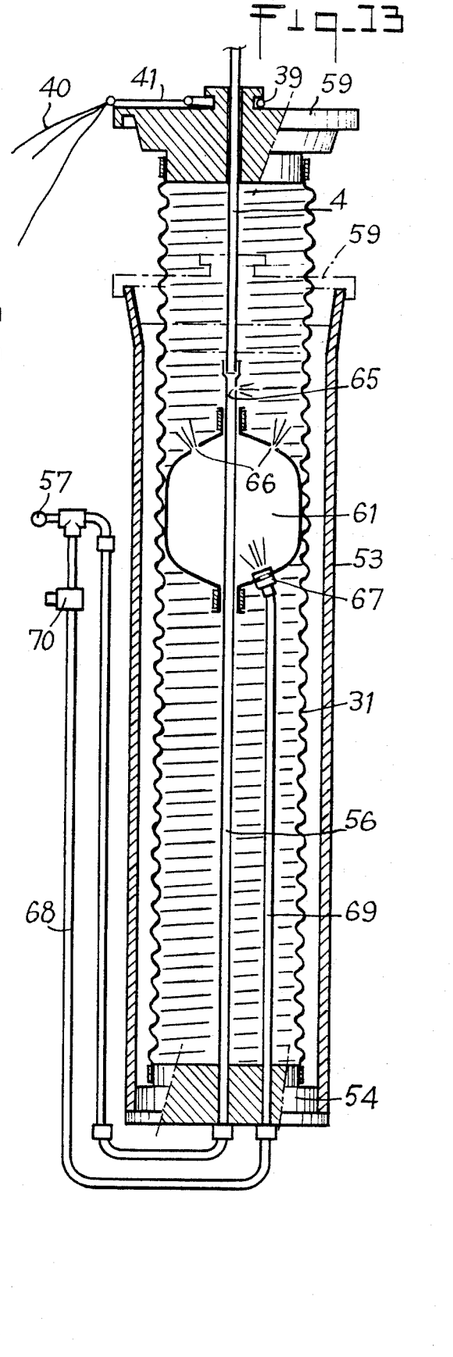
FIG. 13 illustrates the cylinder according to FIG. 12 but in which the pocket is air-fed through a separate pipe.

FIG. 13 illustrates a variant of the device described with reference to FIG. 12. According to this embodiment, the pocket is inflated by way of a valve 67, fixed at the lower part of the pocket 61 and connected to the air collector 57 by way of a pipe 68, feeding air to the lower part of the cylinder and extended by a flexible type pipe 69 issuing into the valve 67. Another valve 70, a slide valve for example, mounted on the pipe 68 enables to control the air flow into the pocket 61 in order to modulate its deformation and more or less slow down the extension of the chamber 31.

The retraction of the pocket is obtained by creating a depression in the air circuit such as explained hereinabove.

Figure 14:
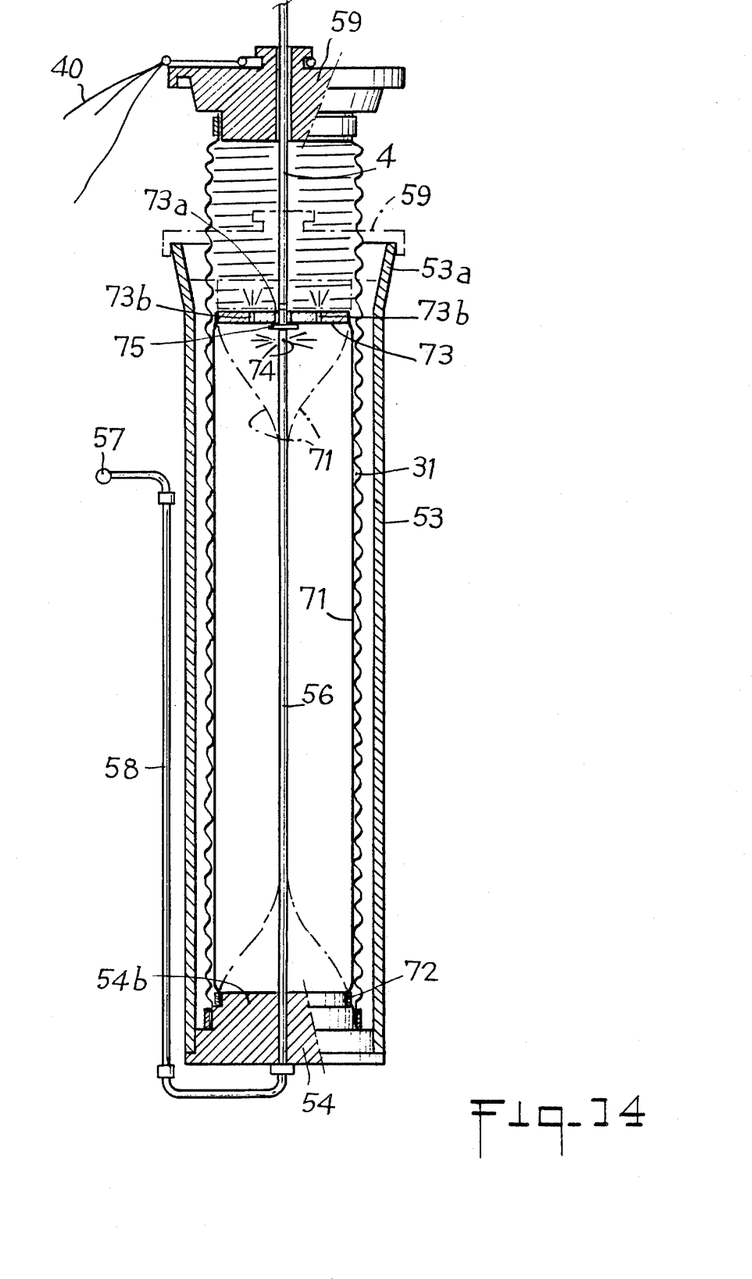

FIG. 14 illustrates another variant of the device illustrated in FIG. 12. According to this variant, the means used for slowing down the extension of the air chamber 31 consists in a sleeve-shaped pocket 71, made from a deformable membrane of plastic material, such as polyester, which sleeve has a diameter approximately equal to the inner diameter of the air chamber 31 when retracted.

Said sleeve 71 extends in the center of the chamber 31: between the bottom of the cylinder 54 and the piston 59, when the latter closes off the widening out upper part 53a of said cylinder.

The sleeve 71 is secured to the bottom of the cylinder by being clamped (72) over a hammered out cylindrical portion 54b.

It is provided at its other end situated on the side of the opening 53a of the cylinder, with a rigid disc 73 closing it partly in that spot.

The disc 73 has an external diameter smaller than the inner diameter of the sleeve 31, and is perforated through its center 73a to allow the passage of air pipe 56, and it comprises one or two through-holes 73b. Said through-holes 73b have a diameter of about 5 mm and are provided to let the air through when the air chamber 31 is pressurized or depressurized to cause it to extend or to retract. The air is admitted into the pocket 71 or sucked out thereof via one or two orifices provided in the wall of air pipe 56. Said orifices are situated close to the disc 73, for example at a distance of about 2 to 4 cm therefrom. This arrangement is designed to create a depression inside the sleeve 71 without obturating the holes 74. Indeed, when creating a depression in the sleeve 71 with a view to causing the retraction of the air chamber 31, the sleeve is applied around the pipe 56, as illustrated in dashed and dotted lines in FIG. 14.

The rigidity of the disc 73 and the relative position of the orifices 74 with respect to the latter prevents the obturation of the said orifices.

When the air chamber 31 is fully retracted inside the cylinder 53, the piston 59 rests against the rigid disc 73 of the sleeve 71 and closes off the orifices 73a provided for the passage of air.

The rigid disc 73 of the pocket 71 rests against a circular abutment 75 fixed on the central air pipe 56 and extending inside a plane perpendicular to said pipe.

What is claimed is:

1. A device for unfolding and for folding back at least one thermal screen inside a structure having a roof with a center, such as a hothouse, said device comprising: a plurality of hoops arranged at spaced intervals inside said structure, each hoop being formed of a tube having an upper end connected to said center inside said structure, and a lower end supported on the ground, a plurality of extensible sleeves, at least some of said hoops being surrounded by one each of said sleeves, each sleeve being an air chamber comprising a first end fixed at the lower end of the respective hoop and a second, movable end comprising a piston having a perforated center and slidable over the respective hoop, said screen having one end fixed to said lower ends of at least some of said plurality of hoops and another end fixed to said piston, said air chambers have helical reinforcements placed inside said chambers, and means for blowing air into said air chambers adjacent there lower ends to thereby cause displacement of the pistons and unfolding of the screen.

2. A device as claimed in claim 1, wherein said helical reinforcements are provided within confining walls of said chambers.

3. A device as claimed in claim 2, wherein the air chambers contain metallic helical reinforcements integral with the walls of the chambers.

4. A device for unfolding and for folding back at least one thermal screen inside a structure having a roof with a center, such as a hothouse, said device comprising: a pluraity of hoops arranged at spaced intervals inside said structure, each hoop being formed of a tube having an upper end connected to said center inside said structure and a lower end supported on the ground, a plurality of extensible sleeves, at least some of said hoops being surrounded by one each of said sleeves, each sleeve being an air chamber comprising a first end fixed at the lower end of the respective hoop, and a second, movable end comprising a piston having a perforated center and slidable over the respective hoop, said screen having one end fixed to said lower ends of at least some of said plurality of hoops and another end fixed to said piston, around some of said hoops there being a second air chamber, one of smaller cross-section than the other and arranged within the other, both air chambers being fixed at the lower end of the hoop and on the piston, and means for blowing air into said air chambers adjacent the lower ends to thereby cause displacement of the pistons and unfolding of the screen.

5. A device as claimed in claim 4, wherein the air chamber of larger cross-section comprises perforations situated adjacent the piston to create air leaks thus allowing a flow of fresh air to circulate in an area defined by the screen and forming an air cushion for supporting the screen.

6. A device for unfolding and for folding back at least one thermal screen inside a structure having a roof with a center, such as a hothouse, said device comprising: a plurality of hoops arranged at spaced intervals inside said structure, each hoop being formed of a tube having an upper end connected to said center inside said structure and a lower end supported on the ground, a plurality of extensible sleeves, at least some of said hoops being surrounded by one each of said sleeves, each sleeve being an air chamber comprising a first end fixed at the lower end of the respective hoop, and a second, movable end comprising a piston having a perforated center and slidable over the respective hoop, said screen having one end fixed to said lower ends of at least some of said hoops and another end fixed to said piston, said device comprising close to and below the pistons of several air chambers and placed in contact with the wall of the respective air chamber means for slowing down the extension of the air chamber when the latter is pressurized, in order to ensure a good air distribution in the inflated part of the chamber and to prevent said part from winding itself around the hoop when the screen is being unfolded.

7. A device as claimed in claim 6, wherein said means for slowing down the extension of the respective air chamber comprises a deformable membrane forming an annular pocket which surrounds the air chamber, said pocket being connected to an air circuit to be pressurized and cause deformation of the membrane on the outer periphery of the chamber, thereby exerting on the latter a peripheral pressure, and to be placed in a state of depression and retracted when the air chamber retracts.

8. A device as claimed in claim 7, wherein said device comprises at the lower end of at least some hoops, a cylinder which encloses the respective hoop and at a bottom of which is fixed one end of an air chamber, said cylinder encloses the air chamber when the latter is fully retracted, said cylinder having an open end, one of said means for slowing down the extension of the air chamber being provided near said open end.

9. A device as claimed in claim 8, wherein the hoop extends inside the cylinder substantially co-axially thereto and wherein in a fully retracted position of the chamber, the piston closes off an upper end of said cylinder.

10. A device as claimed in claim 9, wherein said means for slowing down the entension of the chamber are fixed close to the piston of the fully retracted chamber.

11. A device as claimed in claim 10, wherein each cylinder is connected by way of a pipe to an air collector, said pipe issuing into a lower part of the cylinder to feed air to the air chamber.

12. A device as claimed in claim 6, wherein said means for slowing down the extension of the air chamber comprises a deformable membrane forming a pocket and fixed inside and in the center of the respective sleeve, said pocket being connected to an air circuit to be inflated and brought to rest against the inner periphery of the sleeve, thereby exerting a pressure on the latter and to be placed in a state of depression and retracted when the sleeve retracts.

13. A device as claimed in claim 12, wherein the pocket is placed around an air feeding pipe placed substantially co-axially to the sleeve, said pipe being provided with at least one orifice issuing into the pocket for pressurizing and depressurizing said pocket.

14. A device as claimed in claim 12, wherein air is fed to the pocket through a pipe connected to the air circuit and issuing into a valve fixed on said pocket for pressurizing and depressurizing said pocket.

15. A device as claimed in claim 13, wherein the pocket comprises orifices situated on the piston side in order to create air leaks in part of the chamber situated between the pocket and the piston thus causing the extension and retraction respectively of the air chamber.

16. A device as claimed in claim 14, wherein the pocket comprises orifices situated on the piston side in order to create air leaks in part of the chamber situated between the pocket and the piston thus causing the extension and retraction respectively of the air chamber.

17. A device as claimed in claim 6, wherein said means for slowing down the extension of the air chamber comprises a sleeve comprising a first, lower end fixed at the lower end of the air chamber, and a second, upper end comprising a rigid disc having a perforated center traversed by an air feeding pipe substantially co-axially to the sleeve, said rigid disc having at least one other orifice to allow air therethrough, said piston resting against said disc when the air chamber if fully retracted to thereby close off said orifice and wherein an orifice is provided in the wall of said air feeding pipe, to feed air to the sleeve of the chamber or to depressurize the same, said orifice being situated close to said disc.

18. A device as claimed in claim 17, wherein said device comprises at the lower end of at least some hoops a cylinder having a lower, closed end and an upper, open end, said cylinder enclosing said hoop and said air feeding pipe, and at the bottom of which cylinder are fixed both the lower end of the air chamber and the lower end of the sleeve, said cylinder housing the air chamber when the latter is fully retracted, said piston closing the open end of the cylinder.

19. A device as claimed in claim 11 or 18, wherein each cylinder is at least partly sunk into the ground to hereby prevent the screens from shading areas close to the hoops when said screen is in folded-back position.

* * * * *